INVENTOR.
THOMAS A. BOMBICINO
BY John A. Lahive, Jr.
ATTORNEYS

United States Patent Office 3,540,976
Patented Nov. 17, 1970

3,540,976
COMPOSITE INSULATING LAMINATE AND
METHOD FOR MAKING THE SAME
Thomas A. Bombicino, Wayland, Mass., assignor to New England Mica Company, Waltham, Mass., a corporation of Massachusetts
Filed Dec. 18, 1967, Ser. No. 691,626
Int. Cl. B32b
U.S. Cl. 161—93                     5 Claims

ABSTRACT OF THE DISCLOSURE

A composite electrically insulating laminar material and a process for manufacturing it. A siliceous layer of a material such as reconstituted mica paper is bonded with a thermoplastic sheet on the one side and an impregnating resin on the other between two outer layers of polyester film. The process sequence first bonds the fragile siliceous material to one polyester film so that the resin may be impregnated without use of a transfer layer prior to the bonding of the glass cloth and second polyester film.

FIELD OF THE INVENTION

This invention relates in general to composite electrically insulating materials and more particularly to a laminate including a siliceous layer bonded between outer protective layers and a process for manufacturing it.

PRIOR ART

The use of laminates including a siliceous layer, such as reconstituted mica paper, bonded to an insulating backing material providing greater tensile strength than the siliceous layer is well known in the art. Such composite laminar insulating materials are used as insulation in transformers and the like and are formed into tapes or sheets of insulating material which can then be used in a variety of electrical constructions. In most applications the tapes and sheets are required to possess relatively uniform dielectric properties over a relatively wide range of temperature. Additionally the insulating sheet must possess reasonably high tensile strength.

It is well known that reconstituted mica and other siliceous sheet materials such as asbestos and glass flakes, are relatively fragile materials exhibiting little tensile strength. In order to overcome these deficiencies such materials are generally used in laminar structures in which the siliceous sheet is first impregnated with a resin and subsequently adhered to an insulating backing material such as glass cloth.

The process of treating mica paper with resin is somewhat awkward because the mica paper sheet is so fragile that the application of the resin to the unsupported mica sheet cannot be accomplished by conventional methods such as rolling or dipping. One approach, described in United States Patent No. 2,868,269, employs a transfer sheet of backing material which carries the resin in its fluid state. Typically the backing material is coated with the resin solution by passing it between rollers, one of which rotates in a bath of the resin solution. The treated backing material is then placed in contact with the mica paper and wound simultaneously on a core with it. In some instances the backing material, such as kraft paper is removed from the impregnated mica paper after polymerization of the resin. In other instances the kraft paper is combined with a glass thread and it is itself bonded through the medium of the polymerized resin to the mica paper. This approach to impregnating the mica paper has the disadvantage that a transfer sheet must be used and must therefore be either removable from the finished product or formed of a material which is compatible with the desired electrical and mechanical properties of the finished product.

A second approach to the problem of producing satisfactory laminates with siliceous materials is described in British Patent No. 1,025,956. In this approach, a siliceous material sheet, such as reconstituted mica paper is bonded to a glass cloth layer through the medium of a fusible bonding sheet. The bonding sheet is formed of a plastic material which has no sharp melting point and no high fluidity at elevated temperature, a typical material being polystyrene. The composite insulating material is formed by winding the three layers together, the fusible bonding sheet being wound between the mica paper and the glass cloth. The unbonded composite material is then baked at a temperature sufficient to fuse the three layers into one firmly bonded laminate. The final laminate consists of a resin impregnated mica paper fused to a glass cloth backing.

SUMMARY OF THE INVENTION

Broadly speaking, in the present invention a continuous layer of a siliceous material, such as reconstituted mica paper is wound onto a core with a layer of a fusible bonding sheet such as polyethylene and an outer sheet formed of a polyester film such as the film sold under the name Mylar by E. I. du Pont de Nemours Co. of Wilmington, Del. The fusible polyethylene sheet is placed between the reconstituted paper and the polyester films. This roll is baked until the polyethylene is fused and thus simultaneously with glass cloth and a second layer of bonds one surface of the mica paper to the polyester film. The other surface of the mica paper is then impregnated with a resin and the laminate is wound onto a core polyester film so that the overall structure is bonded on both outer surfaces by the polyester film. This roll is then baked in an oven until the impregnant is polymerized and the entire composite material is firmly bonded. The resultant structure is then a laminate having polyester film outer layers with reconstituted mica paper and glass cloth fused between them. This material possesses excellent properties as an electrical insulator, as well as suitable mechanical properties such as tensile strength and resistance to tearing. Since the resin is coated onto the siliceous layer after it has been firmly bonded to the nonporous polyester film, it is unnecessary to use a transfer sheet and the resin material may be selected primarily for its electrical characteristics.

DESCRIPTION OF THE DRAWING

With reference now to the drawing, the single figure shows the cross-sectional views of the composite material at various stages in the process of manufacture.

DESCRIPTION OF THE PREFERRED EMBODIMENT

Figure 1A:
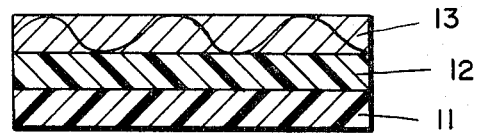

In a specific example of the insulating material of this invention and the process for manufacturing it, a continuous layer of reconstituted mica paper having a thickness of 4 mils and a width of 40" is wound onto a 15" diameter core together with a layer of Mylar, .25 mil thick by 40" wide and a layer of polyethylene, 1 mil thick by 38" wide. In FIG. 1a, a cross-sectional view of this first stage of this process is illustrated. The polyethylene sheet 12 is shown sandwiched between the Mylar film 11 and the reconstituted mica paper 13. This combined roll is then baked in an oven for 4 hours at 265° F. In the resultant composite the polyethylene film is fused and forms an invisible bonding layer between the reconstituted mica paper and the Mylar film.

Figure 1B:
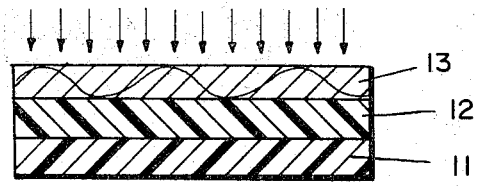

In the next step of the process, as illustrated in FIG. 1b, the exposed face of mica paper is coated with an impregnant consisting of 125 parts by weight of 2 ethyl-hexyl acrylate and one part by weight of tertiary butyl perbenzoate. Once this step is completed then the treated three layer laminate is wound onto a 15″ diameter core in combination with a layer of 1.7 mil thick glass cloth and another layer of .25 mil thick Mylar.

Figure 1C:
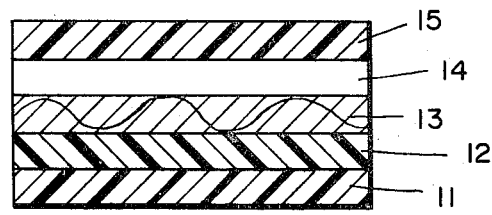

In FIG. 1c, the glass cloth layer 14 is shown positioned between the mica paper 13 and the second Mylar film 15. The roll is then baked in an oven for 8 hours at 265° F. to polymerize the impregnant material and the resultant composite insulating material is a 4 layer laminate with a layer of mica paper and a layer of glass cloth bonded firmly between two outer layers of Mylar.

The electrical characteristics of a composite insulating material formed by the above described process are set forth below in Table I.

Table I

Dielectric strength:
  Sheet form—1140 volts/mil
  Four layers, one half lapped on ¾″ diameter mandrel:
    As wrapped—500 volts/mil
    Baked 4 days at 155° C.—556 volts/mil
Volume resistivity—$1.5 \times 10^{15}$ ohm-cm.
Percent dissipation factor:
  Room temperature—.9%
  100° C.—.9%
  150°—1.1%

In the preferred embodiment, the reconstituted mica paper was bonded through the polymerized impregnant resin to glass cloth between the outer layers of polyester film. The glass cloth does not, however, need to be included. A composite material in which the reconstituted mica paper is bonded through the fusible polyethylene film to one layer of polyester film, impregnated with resin and then a second layer of polyester film is bonded through the polymerized impregnant directly to the other face of the mica paper, has also proven successful.

While in the specific examples the fusible film was described as polyethylene, a number of other thermoplastic materials which do not have sharp melting points and which have fluidity at elevated temperatures may also be used. Such materials include polypropylene, polybutylene, polyvinyl acetate and cellulose acetate. Similarly, there are a number of materials which may be employed as the resin. Suitable materials are the silicones, epoxies, alkyds and shellac.

The invention having been described, various modifications and improvements will occur to those skilled in the art and the invention should be construed as limited only by the spirit and scope of the appended claims.

What is claimed is:
1. A composite insulating material comprising,
a layer of siliceous material,
a first polyester film,
a thermoplastic sheet fused between said polyester film and one surface of said siliceous layer, said fused thermoplastic sheet forming a bond between said first polyester film and said surface of said siliceous layer,
a second polyester film overlying the other surface of said siliceous layer, said second polyester film being bonded to said other surface of said siliceous layer by means of a material with which said siliceous layer has been impregnated, said impregnant material being selected from the group consisting of resins and resin forming monomers.

2. An insulating material in accordance with claim 1 and further including a layer of glass cloth bonded between said other surface of said siliceous layer and said second polyester film.

3. A composite insulating material in accordance with claim 1 wherein said siliceous layer is formed of reconstituted mica paper and wherein said thermoplastic material is selected from the group consisting of polyethylene, polypropylene, polybutylene, polystyrene, polyvinyl acetate, cellulose acetate and blends thereof.

4. A composite insulating material in accordance with claim 3 wherein said reconstituted mica paper has a thickness of approximately 4 mils and said first and second polyester films have thicknesses of .25 mil and wherein said thermoplastic sheet is formed of a 1 mil thick sheet of polyethylene and said impregnant consists of a mixture of 125 parts by weight of 2 ethyl-hexyl acrylate and one part by weight of tertiary butyl perbenzoate.

5. A process for forming a composite insulating material consisting of the steps of:
winding onto a roll contiguous layers of polyester film, thermoplastic sheet and reconstituted mica paper, said thermoplastic sheet being interleaved between said reconstituted mica paper and said polyester film;
baking said combined roll at a temperature such that said thermoplastic sheet fuses forming a bond between the reconstituted mica paper and polyester film;
impregnating the non-bonded surface of said mica paper with a resin;
winding said impregnated laminate onto a core together with a layer of glass cloth and a second polyester film, said glass cloth being placed between said impregnated laminate and said second polyester film; and
baking said roll at a temperature for a period sufficient to polymerize the impregnant resin forming thereby a bond between said second polyester film, said glass cloth and said impregnated laminate.

References Cited

UNITED STATES PATENTS

| | | | |
|---|---|---|---|
| 2,763,315 | 9/1956 | Berberich et al. | 161—163 |
| 2,868,269 | 1/1959 | Letteron | 161—206 XR |
| 2,879,547 | 3/1959 | Morris | 161—189 XR |
| 3,048,651 | 8/1962 | Howard et al. | 156—53 XR |

FOREIGN PATENTS

| | | |
|---|---|---|
| 1,004,493 | 9/1965 | Great Britain. |
| 1,025,956 | 4/1966 | Great Britain. |

ROBERT F. BURNETT, Primary Examiner

W. A. POWELL, Assistant Examiner

PO-1050
(5/63)

UNITED STATES PATENT OFFICE
CERTIFICATE OF CORRECTION

Patent No. 3,540,976      Dated November 17, 1970

Inventor(s) T. A. Bombicino

It is certified that error appears in the above-identified patent and that said Letters Patent are hereby corrected as shown below:

Column 2, lines 29 through 35 should read

-- This roll is baked until the polyethylene is fused and thus bonds one surface of the mica paper to the polyester film. The other surface of the mica paper is then impregnated with a resin and the laminate is wound onto a core simultaneously with glass cloth and a second layer of polyester film so that the overall structure is bounded on both outer surfaces by the polyester film. --

Signed and sealed this 20th day of April 1971.

(SEAL)
Attest:

EDWARD M. FLETCHER, JR.      WILLIAM E. SCHUYLER, JR.
Attesting Officer      Commissioner of Patents